March 5, 1957  W. H. NEWELL  2,783,942
NAVIGATIONAL RHUMB LINE COMPUTER
Filed Sept. 17, 1952

INVENTOR.
WILLIAM H. NEWELL
BY
ATTORNEY

United States Patent Office 2,783,942
Patented Mar. 5, 1957

2,783,942

NAVIGATIONAL RHUMB LINE COMPUTER

William H. Newell, Mount Vernon, N. Y., assignor to Sperry Rand Corporation, a corporation of Delaware Application September 17, 1952, Serial No. 310,013

7 Claims. (Cl. 235—61)

This invention relates to a computer system for making air or sea navigational solutions and more particularly to a system for computing the compass heading and distance to be traversed in moving from one point to another on the earth's surface, either on the surface or through the air, along a pre-selected rhumb line course.

One object of the particular embodiment hereinafter described is to compute the true heading and the compass heading for traversing a rhumb line course between two points on the earth's surface.

Another object is to compute the distance between such points.

Another object is to continuously compute and indicate the distance remaining to be traversed.

Another object is to reduce the time, labor, and possibility of error usually involved in such computations.

The solutions for the ultimate quantities in accordance with the invention involves the continuous determination of the cosine of the average latitudes over the rhumb line course from the present position to the destination and the utilization of this quantity in determining the true heading and the distance from present position to the destination.

The invention contemplates means to compute the cosine of the average latitudes from data which are known or are determinable by navigational instruments, namely the latitude and longitude of the present position and of the destination, and the radius of the earth which is an assumed constant.

For computing the cosine of the average latitudes over the rhumb line course the invention contemplates a three dimensional cam the surface of which is so designed that its radial distance at any point on the surface will correspond to the cosine of the average latitude over the particular rhumb line course for given latitudes of the present position and of the destination. Means are provided in accordance with the invention for constantly receiving the instant value of the said cosine quantity and properly combining it according to derived mathematical formulae with the latitudes and longitudes of the present position and destination and with the radius of the earth to compute the true bearing and the distance-to-go over the rhumb line course.

The invention also contemplates means to introduce a correction quantity into the computed true bearing in accordance with the magnetic variation to determine and indicate the compass heading.

In general, the computer is a compact, lightweight mechanical instrumentality consisting of gearing, three-dimensional cams of the barrel type, a vector solver, counters, dials and knobs which are known expedients in the computer art. It is designed to utilize these elements in solving for compass heading C and distance-to-go S. The necessary inputs are latitude of the present position or point of origin (LAP), latitude of the destination (LAD), longitude of the present position (LGP), longitude of the destination (LGD), and variation (V) between true heading B and compass heading C, due to magnetic variation. These devices are arranged to mechanize assumed mathematical formulae for the solutions sought. Quantities are introduced into the respective devices through simple gear trains and shaft connectors. The inputs, obtained in the usual manner from observation and charts, are introduced into the computer by manual setting of the respective knobs, the values so set in being indicated on suitable counters or dials. These settings alter the mechanical relations between the components in the computer and in a manner to be hereinafter described, to result in the immediate indication of compass heading and distance-to-go. Operations as determined by the assumed formulae and the desired solutions are effected and the results disclosed by appropriate indicators.

Other objects and advantages will become apparent to those skilled in the art from the following disclosure and drawings, in which.

Figure 2:
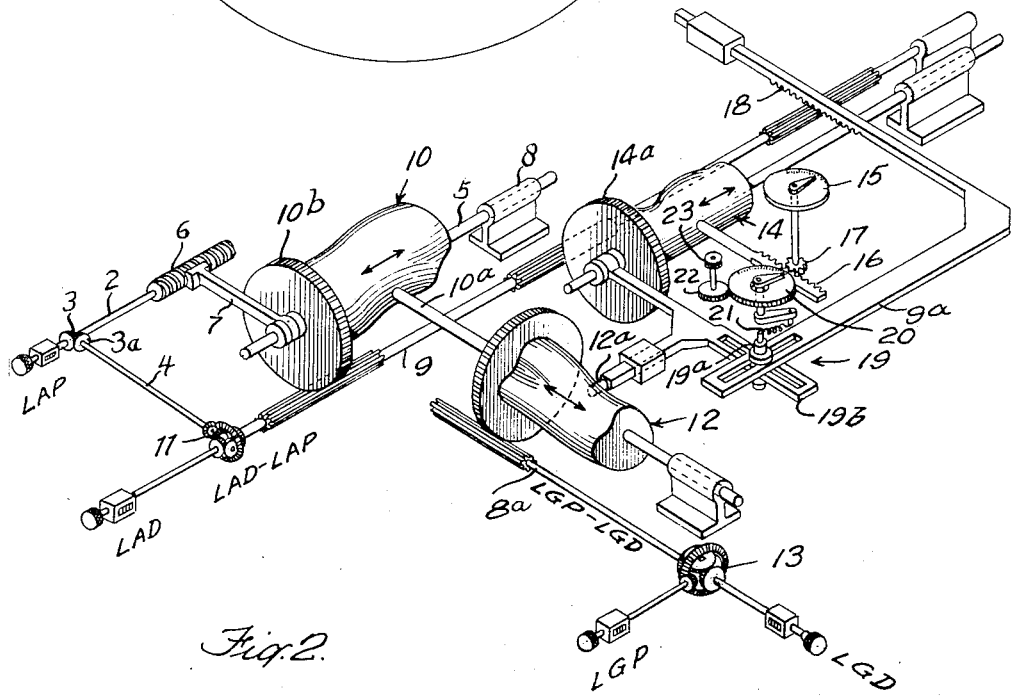
Fig. 2 is a schematic isometric view of an embodiment of the invention.

The computer components, arranged as shown in Fig. 2, solve the following equations, the derivation of which will be shown under the heading "Mathematical analysis".

(1) $$B = \arctan \frac{(LGP - LGD) \cos LA}{LAD - LAP}$$

where cos LA is the cosine of the average latitude over the distance $\overline{S}$ between the present position of the plane and the destination, and (2) $$S = R\sqrt{(LAD - LAP)^2 + (LGP - LGD)^2 \cos \overline{LA})^2}$$

where R is the radius of the earth, considered as a constant, and (3)
$$\cos LA = \frac{(LAD - LAP)}{\log(\sec LAD + \tan LAD) - \log(\sec LAP + \tan LAP)}$$

Figure 1:
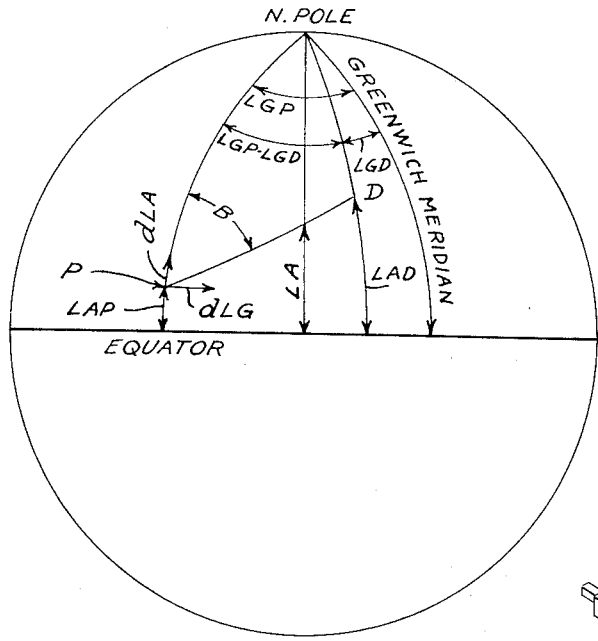
Fig. 1 is a diagram showing a typical problem the solution of which is made by the invention.

The quantities in the three equations are defined in Fig. 1 which illustrates the problems solved by invention.

LAP and LAD knobs are in reciprocating and rotative engagement, respectively, with a three dimensional cam 10 for computing the cosine of the average latitude (cos LA) over the rhumb line course. The LAD counter is directly connected to one side of differential 11 and the latitude of the destination (LAD) is thereby manually set into the differential. The latitude of the present position (LAP) is similarly introduced into the differential 11 by means of shaft 2 which is turned by the LAP knob, bevel gear 3 on shaft 2, bevel gear 3ª on shaft 4 which introduces a quantity representing latitude of present position into the other side of the differential 11. The output from the differential 11 (LAD−LAP) is introduced into cam 10 through gear shaft 9, the longitudinally disposed teeth of which are in permanent engagement with cam gear 10ᵇ secured to cam shaft 5. The cam 10 is reciprocated axially, in accordance with the latitude of present position by means of worm 6 on the shaft 2 and a member 7 one end of which is adapted to engage the worm 6 the other end being attached to the cam shaft 5. A bracket 8 slidably supports one end of the shaft 5 the other end of which is supported by gear shaft 9 through its engagement with the cam gear 10ª.

The conformation of the surface of cam 10 is such that its radial distance at any point on the surface corresponds to the cosine of the average latitude over the particular rhumb line course in accordance with Equation 3.

A three dimensional cam 12 for multiplication, similarly capable of axial displacement and rotation, is in contact with cam 10 through a cam follower 10a. The output of cam 10 is thereby introduced into multiplier cam 12. The longitudes of the present position and destination are manually set into differential 13 from LGD and LGD knobs respectively. The differential output is introduced into multiplier cam 12 by driving the latter in rotation by means of gear shaft 8a in a manner similar to that described for the rotation of cam 10.

The output of the three dimensional cam 12 is a product of the two input quantities cos $\overline{LA}$ and $LGP - LGD$. This quantity is taken off cam 12 by means of a cam follower 12a which is connected to a distance solver three dimensional cam 14 to axially displace the cam 14 which is in rotative engagement with gear shaft 9 through cam gear 14a as is the three dimensional cam 10. The surface of the cam 14 is so designed that the radial distance of any point corresponds to the linear distance between present position and destination in accordance with Equation 2.

The input quantities for cam 14 are $(LGP - LGD)$ cos $\overline{LA}$ and $LAD - LAP$. With these quantities the cam 14 solves for the linear distance over the rhumb line course between the points of origin and destination in accordance with Equation 2. This quantity is transferred to a distance indicator 15 through a cam follower and associated rack 16 and pinion 17 mounted on the distance indicator vertical shaft as shown in Fig. 2. Alternatively the cam 14 may solve for angular distance, the conversion to great circle distance which involves the radius of the earth R being made by gearing of suitable ratio.

The gear shaft 9 is also in connection with a rack 18 as shown in Fig. 2. The rotation of the gear shaft imparts a corresponding translating motion to the rack which moves one component 9a of vector solver 19 accordingly. The movement of this component represents an input of the quantity $LAD - LAP$. The other component 19b of vector solver 19 is moved at 90° to the first by virtue of its connection with the cam follower of multiplier cam 12, representing an input of the quantity $(LGP - LGD)$ cos $\overline{LA}$. The resultant vector represents a mathematical solution of Equation 1 for the heading B for the rhumb line course. An indicator hand of compass indicator 20 is positioned in accordance with the tension and direction of pull spring 21 one end of which is connected to an arm of the vertical shaft which governs the direction of the indicator hand and the other end is connected to pin 19a which is positioned by the two components of the vector solver 19. The dial of compass indicator 20 is mounted for rotation about its axis and is rotated through the angle V by means of a connecting gear train 22 which is operated manually from a magnetic variation knob 23. The compass heading required for the rhumb line course between the two points is accordingly indicated on dial 20.

*Mathematical anaylsis*

A rhumb line is a line on the surface of the earth making the same angle B with all meridians of longitude.
At any point on the rhumb line $$dS \sin B = -RdLG \cos LA$$

and $$dS \cos B = RdLA$$

where $dS$, $dLG$ and $dLA$ are differentials of distance, longitude and latitude respectively.
Where longitude is decreasing, as in Fig. 1.

(4) $$\tan B = \frac{-(\cos LA)\, dLG}{dLA}$$

in terms of LAP, LAD, LGP and LGD $$-\tan B = \frac{LGP \int_{LGP}^{LGD} dLA}{LAD \int_{LAP}^{LAD} \frac{dLA}{\cos LA}}$$

(5)
$$\tan B = \frac{LGP - LGD}{\log(\sec LAD + \tan LAD) - \log(\sec LAP + \tan LAP)}$$

Multiplying and dividing the right hand member of Equation 5 by $(LAD - LAP)$ yields (6)
$$\tan B = \frac{LGP - LGD}{LAD - LAP}$$
$$\left[\frac{LAD - LAP}{\log(\sec LAD + \tan LAD) - \log(\sec LAP + \tan LAP)}\right]$$

This can be written—

(7) $$\tan B = \frac{(LGP - LGD) \cos \overline{LA}}{LAD - LAP}$$

where $\overline{LA}$ is an average latitude whose cosine is given by (3) $$\frac{LAD - LAP}{\log(\sec LAD + \tan LAD) - \log(\sec LAP + \tan LAP)}$$

True course is solved for by the mechanism, using the inverse of Equation 7, that is, according to Equation 1. An expression for distance-to-go S is derived by putting $$dS = \sqrt{R^2 (dLA)^2 + R^2 (\cos^2 LA)(dLG)^2}$$
$$= RdLA\sqrt{1 + \frac{(dLG)^2 \cos^2 LA}{(dLA)^2}}$$

But $$-\tan B = \frac{(\cos LA)\, dLG}{dLA}$$

therefore $$dS = RdLA\sqrt{1 + \tan^2 B}$$

and since B is constant (8) $$S = \int_P^D dS = (R\sqrt{1 + \tan^2 B})(LAD - LAP)$$

Substituting the value for tan B shown in Equation 7, we get $$S = R(LAD - LAP)\sqrt{1 + \frac{(LGP - LGD)^2 \cos^2 \overline{LA}}{(LAD - LAP)^2}}$$

or (2) $$S = R\sqrt{(LAD - LAP)^2 + (LGP - LGD)^2 \cos^2 \overline{LA}}$$

It is understood that the invention resides in an arrangement of computers to solve for the desired quantities from known data according to the given mathematical formulae and is to be limited only in accordance with the following claims.

I claim:
1. A rhumb line computer mechanized to compute distance between the present position and a destination over a rhumb line course according to the formula

$$S = R\sqrt{(LAD - LAP)^2 + (LGP - LGD)^2 (\cos^2 \overline{LA})}$$

where S is said distance, LAD is the latitude of the destination, LAP is the latitude of present position, LGP is the longitude of present position, LGD is the longitude of the destination, $\overline{LA}$ is the average latitude of the rhumb line course, and $\overline{R}$ is the radius of the earth, said computer comprising in combination means for computing the cosine of the average latitude over the selected rhumb line course, a multiplier, means for introducing the cosine of the average latitude over the selected rhumb line course into said multiplier, means for introducing the difference between the longitudes of present position and the destination into said multiplier, computing means for computing the square root of the sum of the squares of two variables quantities, and means for introducing the difference between the latitudes of present position and destination as one variable quantity and the output of said multiplier as a second variable quantity into said computing means the output of which is proportional to the required distance according to the above formula.

2. A rhumb line computer as defined in claim 1 in which the cosine computing means is a three dimensional barrel type cam, the multiplier is a three dimensional cam positioned axially by the output of the first mentioned cam and the computing means is a three dimensional cam positioned axially in accordance with the output of the multiplier cam.

3. A rhumb line computer as defined in claim 2 in which the means for rotatively positioning the cosine computing cam and the computing cam is a common gear shaft.

4. A rhumb line computer mechanized to compute the true heading long a rhumb line course according to the formula $$B = \text{arc tan} \frac{(LGP - LGD) \cos \overline{LA}}{LAD - LAP}$$

where B is the angular position of the indicator with respect to the true north, LGP is the longitude of present position, LGD is the longitude of the destination, $\overline{LA}$ is the average latitude over the rhumb line course, LAD is the latitude of the destination and LAP is the latitude of the present position, said computer comprising in combination means for computing the cosine of the average latitude over the rhumb line course, a multiplier, means for introducing the cosine of the average latitude over the selected rhumb line course into said multiplier, means for introducing the difference between the longitudes of present position and the destination into said multiplier, a vector solver, means for introducing the output of said multiplier and the difference between the latitudes of destination and present position into said vector solver the vectorial output of which represents the true heading.

5. A rhumb line computer comprising a three dimensional cam the surface of which is so designed that its radial distance at any point corresponds to the cosine of the average latitude over a selected rhumb line course, a multiplier, means for introducing the output of said cam into said multiplier, means for differentially combining the longitudes of present position and destination and introducing the combined quantity into said multiplier, a vector solver, means for introducing the output of said multiplier and the difference between the latitudes of destination and present position into said vector solver the vectorial output of which represents the true heading.

6. A rhumb line computer mechanized to compute the true heading along a rhumb line course according to the formula $$B = \text{arc tan} \frac{LGP - LGD \cos \overline{LA}}{LAD - LAP}$$

where B is the angular position of the indicator with respect to the true north, LGP is the longitude of present position, LGD is the longitude of the destination, $\overline{LA}$ is the average latitude over the rhumb line course, LAD is the latitude of the destination and LAP is the latitude of the present position, said computer comprising in combination a three dimensional cam for computing the cosine of the average latitude over the rhumb line course, a gear shaft for rotating said cam in accordance with the difference between latitudes of destination and present position, means for axially positioning said cam in accordance with the latitude of the present position, a three dimensional cam multiplier axially positioned in accordance with the output of the first mentioned cam and rotated in accordance with the difference between the longitudes of present position and destination, and a vector solver one element of which is positioned in accordance with the output of said multiplier, the other element being positioned by said gear shaft, the vectorial output of said vector solver representing the true heading.

7. A rhumb line computer mechanized to compute true heading and distance over a rhumb line course comprising in combination a three dimensional cam for computing the cosine of the average latitude over the rhumb line course, a gear shaft for rotating said cam in accordance with the difference between the latitudes of destination and present position, means for axially positioning said cam in accordance with the latitude of the present position, a three dimensional cam multiplier axially positioned in accordance with the output of the first mentioned cam and rotated in accordance with the difference between the longitudes of present position and destination, a vector solver one element of which is positioned by said cam multiplier, the other element being positioned by said gear shaft, the vectorial output of said vector solver representing the true heading in accordance with the following equation:

$$B = \text{arc tan} \frac{LGP - LGD \cos \overline{LA}}{LAD - LAP}$$

where B is the angular position of the indicator with respect to the true north, LGP is the longitude of present position, LGD is the longitude of the destination, $\overline{LA}$ is the average latitude over the rhumb line course, LAD is the latitude of the destination and LAP is the latitude of the present position, and a computing three dimensional cam rotated by said gear shaft and axially positioned by said cam multiplier, the output of said computing cam representing distance over the rhumb line course according to the equation:

$$S = R\sqrt{(LAD - LAP)^2 + (LGP - LGD)^2 \cos^2 \overline{LA}}$$

where S is said distance, LAD is the latitude of the destination, LAP is the latitude of present position, LGP is the longitude of present position, LGD is the longitude of the destination, $\overline{LA}$ is the average latitude of the rhumb line course, and R is the radius of the earth.

References Cited in the file of this patent

UNITED STATES PATENTS

| | | |
|---|---|---|
| 1,101,128 | Jensen et al. | June 23, 1914 |
| 2,376,719 | Papello | May 22, 1945 |
| 2,385,348 | Chafee | Sept. 25, 1945 |
| 2,609,729 | Wilkenson et al. | Sept. 9, 1952 |